(12) United States Patent
Lin et al.

(10) Patent No.: US 8,820,702 B2
(45) Date of Patent: Sep. 2, 2014

(54) PROJECTING APPARATUS HAVING ADJUSTING FUNCTION

(71) Applicant: Delta Electronics, Inc., Taoyuan Hsien (TW)

(72) Inventors: Hsing-Tsung Lin, Taoyuan Hsien (TW); Lin-Hung Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/853,262

(22) Filed: Mar. 29, 2013

(65) Prior Publication Data

US 2013/0221179 A1    Aug. 29, 2013

Related U.S. Application Data

(62) Division of application No. 13/205,977, filed on Aug. 9, 2011.

(51) Int. Cl.
*A47F 5/00* (2006.01)
*A47F 7/00* (2006.01)
*F16M 11/00* (2006.01)
*F16M 13/00* (2006.01)

(52) U.S. Cl.
USPC ............ 248/660; 248/124.1; 248/176.1; 211/13; 211/26

(58) Field of Classification Search
USPC ............ 248/660, 183, 122, 124, 181, 179; 211/13, 26
See application file for complete search history.

(56) References Cited

U.S. PATENT DOCUMENTS

| | | | | |
|---|---|---|---|---|
| 3,586,278 A | * | 6/1971 | Simons | 248/165 |
| 3,912,385 A | * | 10/1975 | Stokes et al. | 353/94 |
| 4,148,453 A | * | 4/1979 | Brantly | 248/660 |
| D259,454 S | * | 6/1981 | Gudgel | D16/235 |
| 4,526,337 A | * | 7/1985 | Viasmensky | 248/639 |
| 4,653,717 A | * | 3/1987 | Bergstrom | 248/664 |
| 4,997,270 A | * | 3/1991 | Shaw | 352/57 |
| 2010/0321646 A1 | | 12/2010 | Nakano et al. | |

FOREIGN PATENT DOCUMENTS

| | | |
|---|---|---|
| JP | 1992089941 U | 8/1992 |
| JP | 2000019638 A | 1/2000 |
| JP | 2005201954 A | 7/2005 |
| JP | 2011002610 A | 1/2011 |
| TW | M3944901 U1 | 12/2010 |

* cited by examiner

*Primary Examiner* — Amy J Sterling
(74) *Attorney, Agent, or Firm* — Muncy, Geissler, Olds & Lowe, P.C.

(57) ABSTRACT

A projecting apparatus has an adjusting function to adjust a sub-projecting apparatus. The projecting apparatus includes a projector, a first supporting rack disposed on a side wall of the projector, a first carrying seat disposed on the first supporting rack, an adjusting mechanism disposed on the first supporting rack and connected to the first carrying seat, a second supporting rack disposed on the side wall of the projector, and a second carrying seat pivoting on the second supporting rack. The sub-projecting apparatus is disposed on the first carrying seat and the second carrying seat, the adjusting mechanism is adjusted to move the first carrying seat relative to the first supporting rack, and the first carrying seat drives the sub-projecting apparatus to rotate.

9 Claims, 11 Drawing Sheets

PROJECTING APPARATUS HAVING ADJUSTING FUNCTION

CROSS-REFERENCE TO RELATED APPLICATIONS

The present application is a divisional application of pending U.S. patent application Ser. No. 13/205,977, filed on Aug. 9, 2011, which claims priority of Taiwan Patent Application No. 100103052, filed on Jan. 27, 2011, the entirety of which is incorporated by reference herein.

BACKGROUND OF THE INVENTION

1. Field of the Invention

This invention relates to a projecting apparatus, and in particular, to a projecting apparatus having an adjusting function.

2. Description of the Related Art

Recently, projectors have been widely used for many occasions, such as for meetings, for home use, and for large-scale performances. In general, projectors used in a meeting or a home are manufactured in smaller and smaller sizes. The advantages of a small projector are its light weight and portability. However, for large-scale performances, the projector must have high illumination to create better image quality, but the weight of the projector is very heavy.

In general, large-scale performances are usually for commercial activity so that the quality of projected image from projectors used, is very important. However, since the weight of the projector is very heavy, it is difficult to adjust placement angle of the projector. In particular, to further increase illumination, at east two projectors are usually stacked together to project the same image simultaneously the same screen. In this situation, to make the image projected from the at least two projectors accurately overlap, a lot of time and manual labor must be spent to adjust the angle of the projectors, which will waste time and money.

BRIEF SUMMARY OF THE INVENTION

To solve the problems of the prior art, the object of the invention is to provide a projecting apparatus having an adjusting function. The projecting apparatus utilizes an adjusting device to adjust the horizontal rotating angle of the projector. Moreover, a plurality of projectors can be stacked together by a rack device, and the horizontal rotating angle of the projectors can be adjusted by an adjusting mechanism.

Thus, an embodiment of the invention provides a projecting apparatus having an adjusting function including a projector and an adjusting device. The projector has an adjusting side. The adjusting device is disposed on the adjusting side. The adjusting device includes a rotatable base, a moving mechanism, a fixed mechanism and an adjusting component. The rotatable base pivots on the projector, and the rotatable base has a rotation axis. The moving mechanism is disposed on the projector. The fixed mechanism includes a fixed base and a fixed component. The fixed component is disposed on the fixed base. The adjusting component is connected to the fixed component and the moving mechanism. The adjusting component is adjusted to move the moving mechanism relatively to the fixed component, and the moving mechanism drives the projector to rotate about the rotation axis.

Further, another embodiment of the invention provides a projecting apparatus having an adjusting function, which adjusts a sub-projecting apparatus stacked on the projecting apparatus. The projecting apparatus includes a projector, a first supporting rack, a first carrying seat, an adjusting mechanism, a second rack, and a second carrying seat. The first supporting rack is disposed on a side wall of the projector. The first carrying seat is disposed on the first supporting rack. The adjusting mechanism is disposed on the first supporting rack and connected to the first carrying seat. The second supporting rack is disposed on the side wall of the projector. The second carrying seat pivots on the second supporting rack, and the second carrying seat has a rotation axis. The sub-projecting apparatus is disposed on the first carrying seat and the second carrying seat. The adjusting mechanism is adjusted to move the first carrying seat relative to the first supporting rack. The first carrying seat drives the sub-projecting apparatus to rotate about the rotation axis.

In conclusion, the horizontal rotating angle and the projection direction of a projecting apparatus of the invention can be adjusted easily and accurately by adjusting the adjusting component. A plurality of projectors can be stacked together by the rack device in the projecting apparatus of the invention. The projection direction of the projector can be adjusted by the supporting rack, the carrying seat, and the adjusting mechanism. A user can adjust the bottom projector first, and than the user can sequentially adjust the projectors stacked on the bottom projector by adjusting the adjusting mechanism. Therefore, the projectors can be adjusted easily, conveniently and speedily, and the image projected from the projectors can accurately overlap on the same screen.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
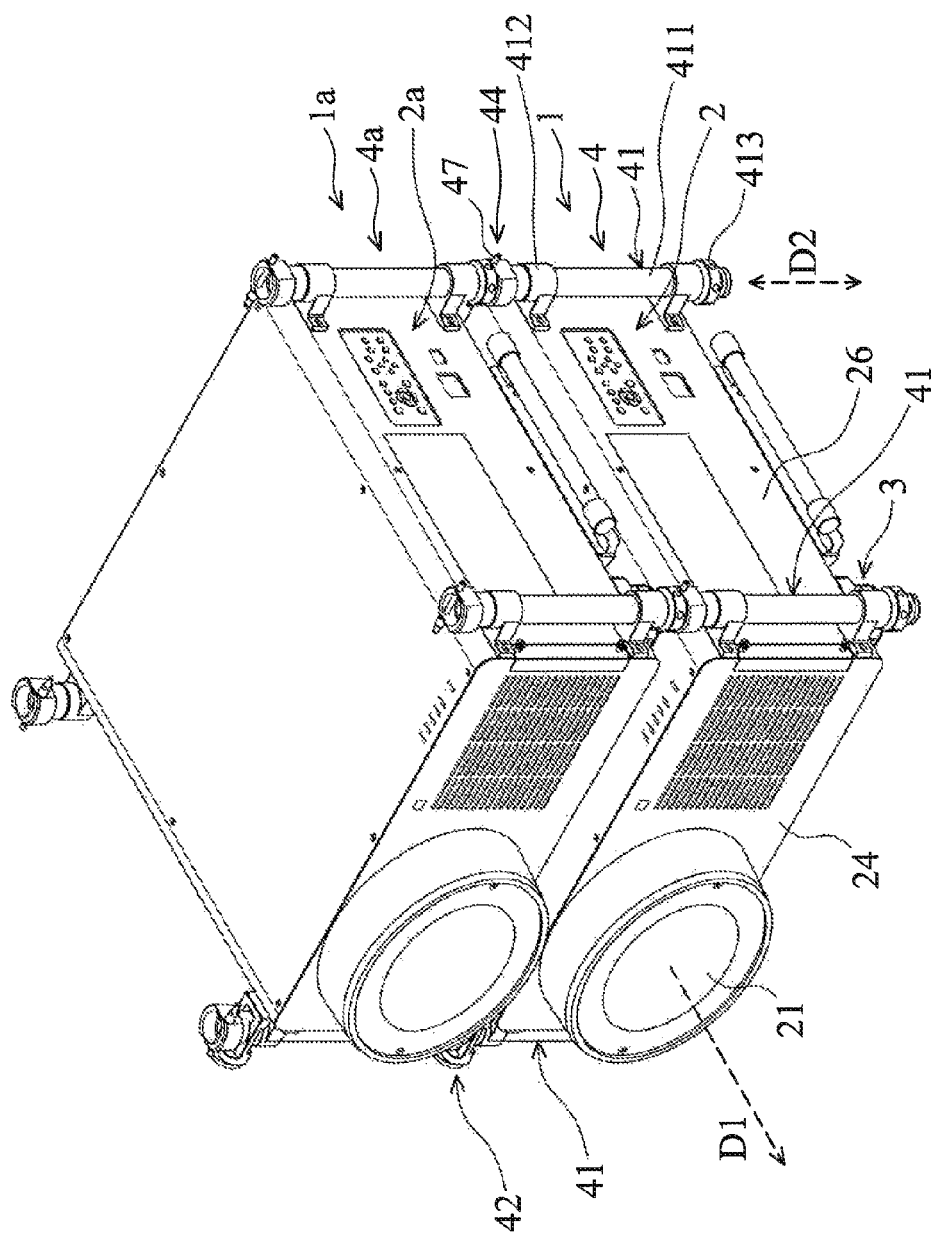
FIG. 1 is a perspective view of a projecting apparatuses having an adjusting function of the invention.

Please refer to FIG. 1, which is a perspective view of a projecting apparatuses 1 having an adjusting function of the invention. In this embodiment, a plurality of projecting apparatuses 1 and 1a can be stacked together with each other. Thus, the projecting apparatuses 1 and 1a can project the same image on the same screen (not shown in the figures) to increase the illumination of the screen.

The projecting apparatus 1 includes a projector 2, an adjusting device 3, and a rack device 4. The projector 2 is a large-scale projector weighing about 30 KG. The projector 2 has a high illumination function so that it is appropriate for use in occasions such as large-scale concerts or a movie theater. The projector 2 has a projecting lens 21 disposed on a side wall thereof. The direction of projecting lens 21 is toward a projection direction D1, and thus the light generated by the projector 2 can be projected on the screen along the projection direction D1 via the projecting lens 21.

The adjusting device 3 is disposed on an adjusting side 22 (shown in FIG. 2) of the projector 2. As shown in the figures, the adjusting side 22 can be a bottom side of the projector 2. In another embodiment, if the projector 2 is hanged from a ceiling, the adjusting side 22 is a top side of the projector 2. The horizontal rotating angle of the projector can be adjusted by the adjusting device 3 to change the projection direction D1 of the projector 2.

The rack device 4 is disposed on the side wall of the projector 2. A rack device 4a of another projecting apparatus (sub-projecting apparatus) 1a can be disposed at the top of the rack device 4, and thus a projector 2a of the projecting apparatus 1a can be stacked on the top of the projector 2. A user can adjust the angle between the projector 2 and the projector 2a. Namely, the horizontal rotating angle and the inclination direction of the projector 2a can be adjusted by the rack device 4.

Figure 2:
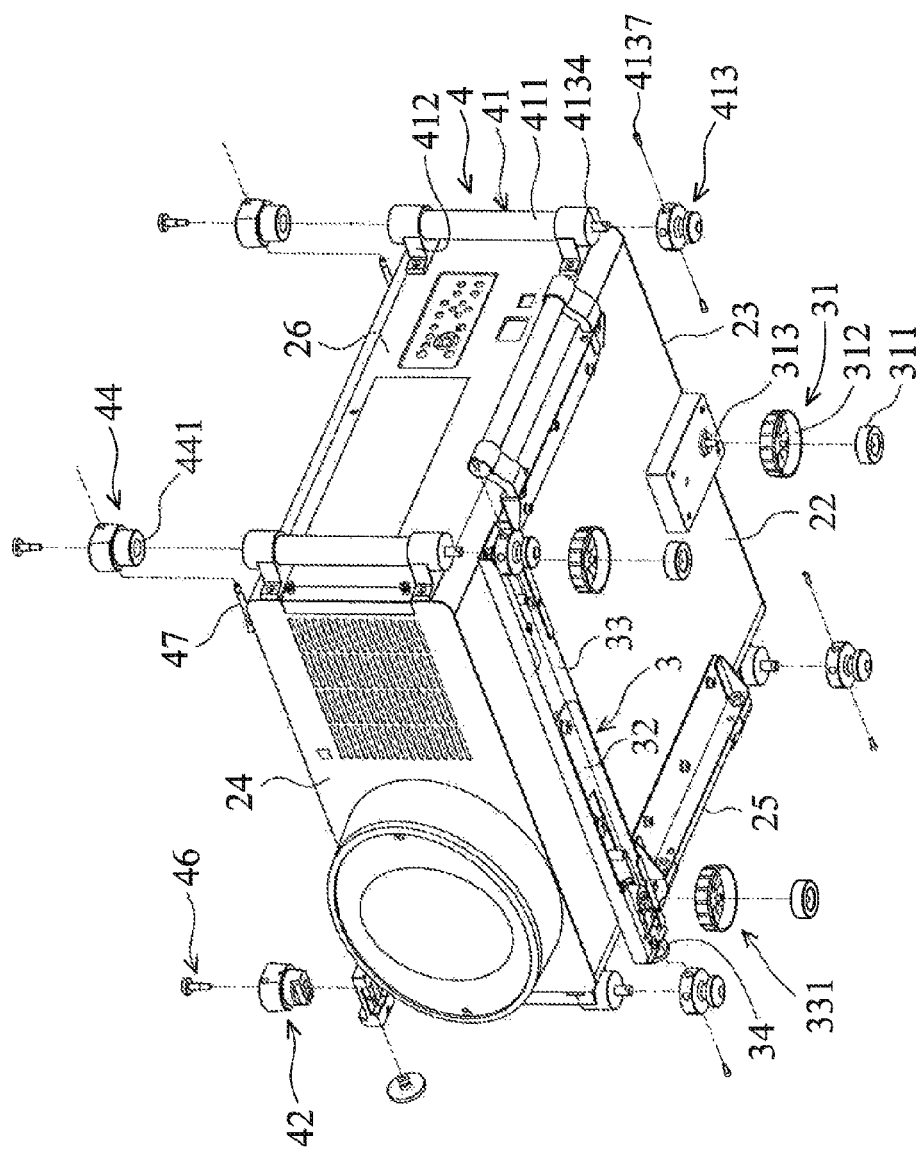
FIG. 2 is an exploded view of a projecting apparatus having an adjusting function of the invention.
Figure 3:
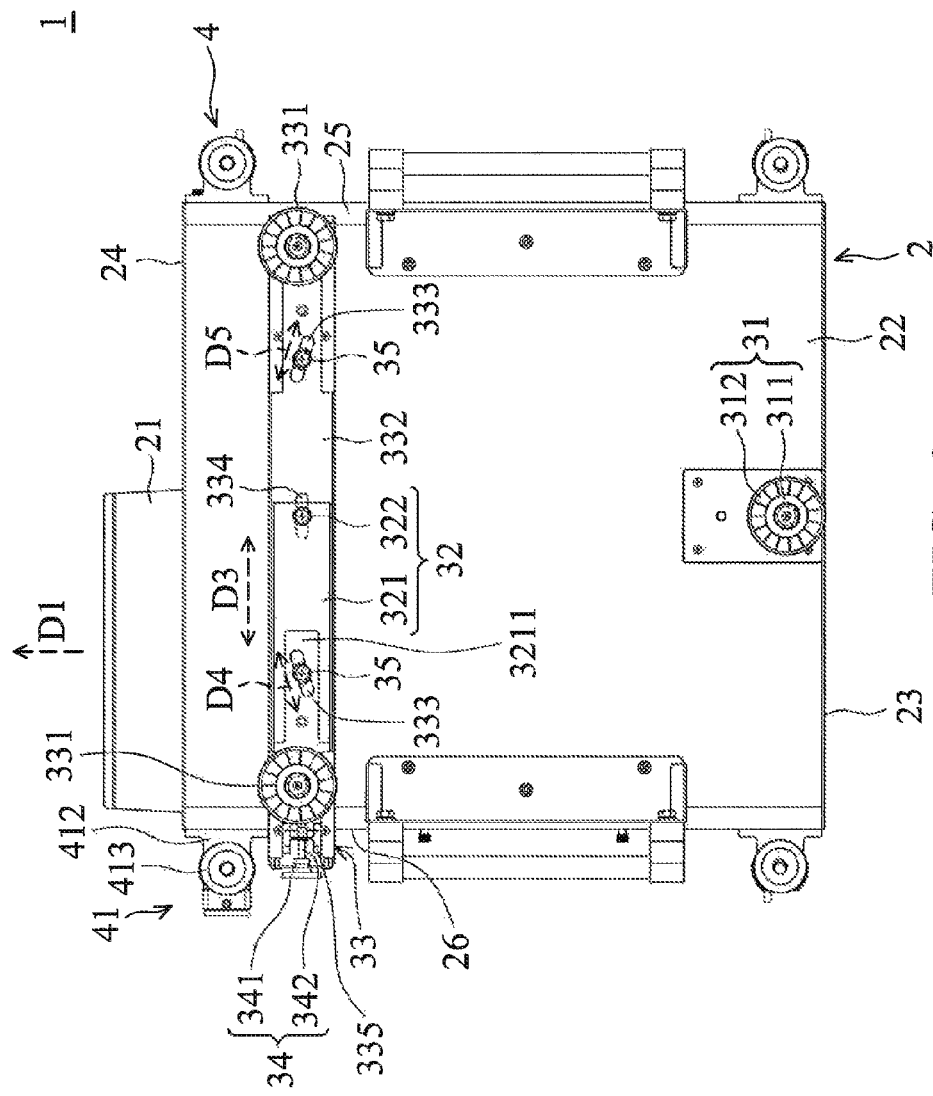
FIG. 3 is a bottom view of a projecting apparatus having an adjusting function of the invention.

Please refer to FIGS. 2 and 3. FIG. 2 is an exploded view of a projecting apparatus 1 having an adjusting function of the invention, and FIG. 3 is a bottom view of the projecting apparatus 1 having an adjusting function of the invention. The adjusting device 3 is disposed at the adjusting side 22 of the projector 2. The adjusting device 3 includes a rotatable base 31, a moving mechanism 32, a fixed mechanism 33, an adjusting component 34 and two retaining components 35. The rotatable base 31 can be disposed at a bottom side and close to the rear side 23 of the projector 2. The rotatable base 31 pivots on the projector 2.

Figure 4:
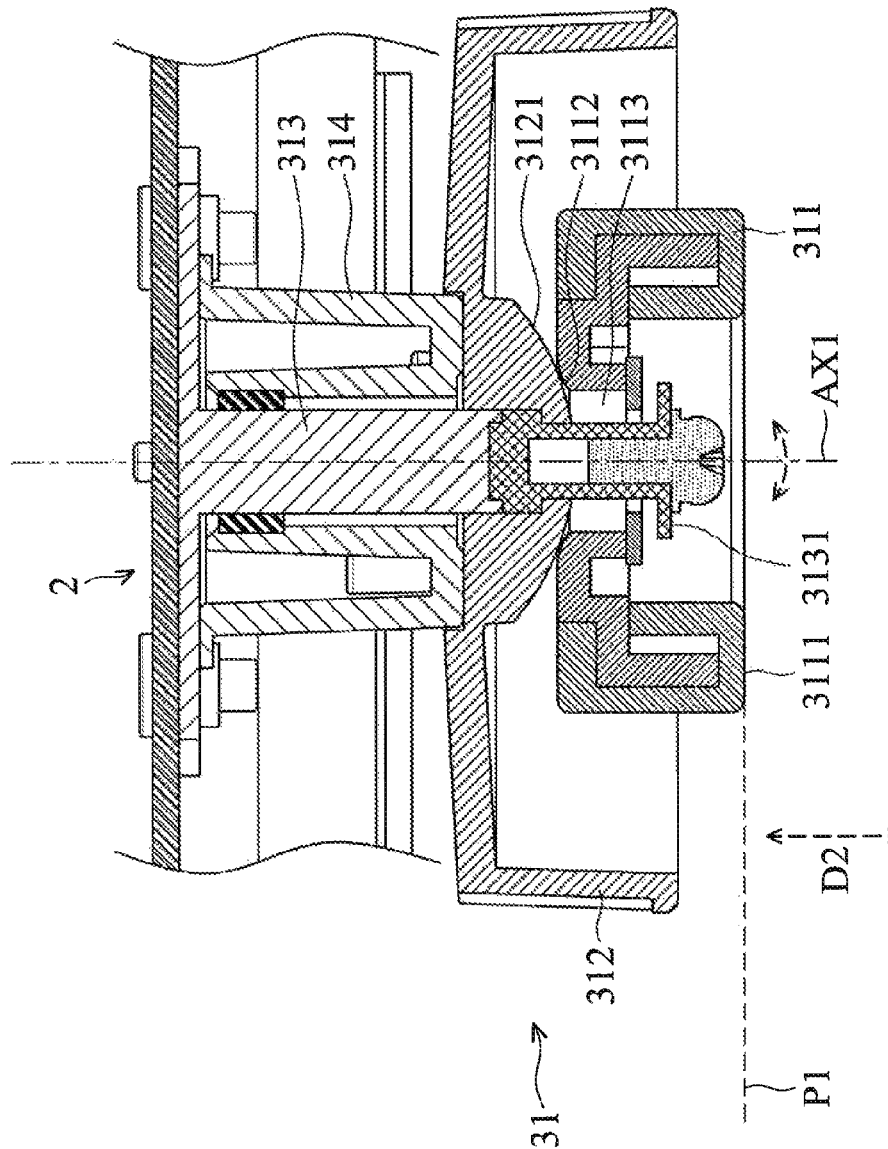
FIG. 4 is a cross-sectional view of a rotatable base of the invention.

Please also refer to FIG. 4, which is a cross-sectional view of the rotatable base 31 of the invention. The rotatable base 31 has a rotation axis AX1. The rotatable base 31 is rotated about the rotation axis AX1. The rotatable base 31 includes a grounding component 311, a height adjusting tray 312, a pivot component 313 and a seat body 314. The grounding component 311 can be movably disposed at an end of the pivot component 313. The height adjusting tray 312 is coupled to the pivot component 313. The grounding component 311 has a grounding surface 3111, a concave arc surface 3112 and a rotation hole 3113. The grounding surface 3111 and the concave arc surface 3112 are disposed at the two opposite sides of the grounding component 311, respectively. The grounding surface 3111 can be contacted to a ground P1. The ground P1 can be a horizontal surface or an inclination surface. The concave arc surface 3112 can be an annular concave surface. The rotation hole 3113 is disposed in the central area of the concave arc surface 3112. The height adjusting tray 312 has an arc surface 3121. The arc surface 3121 correspondingly contacts with the concave arc surface 3112.

The pivot component 313 extends along an extension direction D2. The extension direction D2 is substantially perpendicular to a horizontal surface. One end of the pivot component 313 passes through the arc surface 3121 and the rotation hole 3113. The diameter of the rotation hole 3113 is larger than the width of the cross-section of the pivot component 313. The pivot component 313 has a blocking portion 3131 at the other end thereof. The width of the blocking portion 3131 is larger than the diameter of the rotation hole 3113, and the blocking portion 3131 is close to the grounding surface 3111. Thus, the grounding component 311 is prevented from detaching from the pivot component 313. Due to the above structure, when the grounding component 311 is disposed on an inclined ground P1, the concave arc surface 3112 of the grounding component 311 can slide along the arc surface 3121. Thus, the grounding surface 3111 can contact with the ground P1 and be inclined corresponding to the ground P1.

The pivot component 313 is fastened to the seat body 314. Thus, when the height adjusting tray 312 is rotated, the pivot component 313 can rotated in or out of the seat body 314, and a distance between the grounding component 311 and the projector 2 can be controlled. Further, an inclined angle of the projector 2 can be adjusted.

Please refer to FIGS. 2 and 3. The moving mechanism 32 is fixed on the projector 2. The moving mechanism 32 includes a moving component 321 and a position component 322. The moving component 321 is extended along an adjusting direction D3. The moving component 321 is a strip structure. In the preferred embodiment, the length of the moving component 321 is substantially half of the width of the projector 2. The moving component 321 is disposed at the adjusting side 22. The moving component 321 has a through hole 3211. The adjusting direction D3 is substantially parallel to a horizontal plane, the rear side 23 and the front side 24 of the projector 2. Moreover, the adjusting direction D3 is substantially perpendicular to the projection direction D1. In the embodiment, the moving component 321 does not directly contact with the projector 2. The position component 322 is a screw or a locking component. The position component 322 is fastened to the moving component 321 and the projector 2.

The fixed mechanism 33 includes two fixed bases 331 and a fixed component 332. The fixed bases 331 can be disposed on a ground P1. The fixed bases 331 are close to the front side 24 and two opposite lateral sides 25 and 26 of the projector 2, respectively. The fixed bases 331 are fixed on the fixed component 332. The structure of the fixed bases 331 can be the same as the rotatable base 31. The fixed bases 331 and the rotatable base 31 can be the apexes of a triangle to support the projector 2.

In a preferred embodiment, the fixed component 332 is a strip structure, but it can also be other shapes with the same function. The length of the fixed component 332 is substantially the same as the width of the projector 2 and the fixed component 332 is extended along, the adjusting direction D3. The fixed component 332 is disposed at the adjusting side 22 of the projector 2 between the projector 2 and the moving component 321. The fixed component 332 can not directly contact with the projector 2. The shape of the cross section of the fixed component 332 is a U shape. The moving mechanism 32 is disposed inside the fixed component 332, and movable along the adjusting direction D3. The fixed component 332 has two retaining grooves 333. The retaining grooves 333 are close to the fixed base 331. The retaining grooves 333 extend along tangential directions D4 and D5 respectively. The tangential directions D4 or D5 are directions of a tangent of a circular path, wherein the rotation axis is as an axial center of the circular path. The retaining component 35 is a screw fastened to the projector 2. The retaining components 35 pass through the retaining grooves 333, respectively. The fixed component 332 is separated from the projector 2 by the retaining component 35. In FIG. 3, the fixed base 331 and the retaining component 35 at the left side of the projector 2 are received in the through hole 3211 or passes through the through hole 3211.

The fixed component 332 further has a position groove 334. The position groove 334 is extended along the adjusting direction D3. The position component 322 passes through the position groove 334 to be connected to the projector 2 and the moving component 321.

The adjusting component 34 is connected to the fixed component 332 and the moving mechanism 32. The adjusting component 34 includes a rotation button 341 and an adjusting rod 342. The rotation button 341 pivots at an end of the fixed component 332. The adjusting rod 342 has a screw thread, and the adjusting rod 342 is fastened to an end of the moving component 321. A user can adjust the adjusting component 34 to move the moving mechanism 32 relatively to the fixed component 332, and then the projector 2 can be rotated about the rotation axis AX1. In another embodiment, the adjusting component 34 is a gear set driven by a motor (not shown in the figures), wherein the rotation of the motor can be controlled by a switch or a remote controller, and then the moving mechanism 32 can be moved by the adjusting component 34.

Furthermore, the fixed mechanism 33 further includes an indicating component 335. The indicating component 335 is disposed on the fixed component 332 close to an end of the moving component 321. When the indicating component 335 is located at a specific position of the moving component 321, such as the end of the moving component 321, a user can confirm that the projection direction D1 of the projector 2 is perpendicular to the adjusting direction D3. When the moving component 321 is moved relative to the fixed component 332, the indicating component 335 is moved relative to the specific position, too. Thus, a user can observe a relative moving distance between the fixed component 332 and the moving component 321 via the indicating component 335. Moreover, a scale can be disposed on the indicating component 335. A user can read the scale to know the horizontal rotating angle of the projector according to a degree number corresponding to the specific position of the moving component 32.

Figure 5:
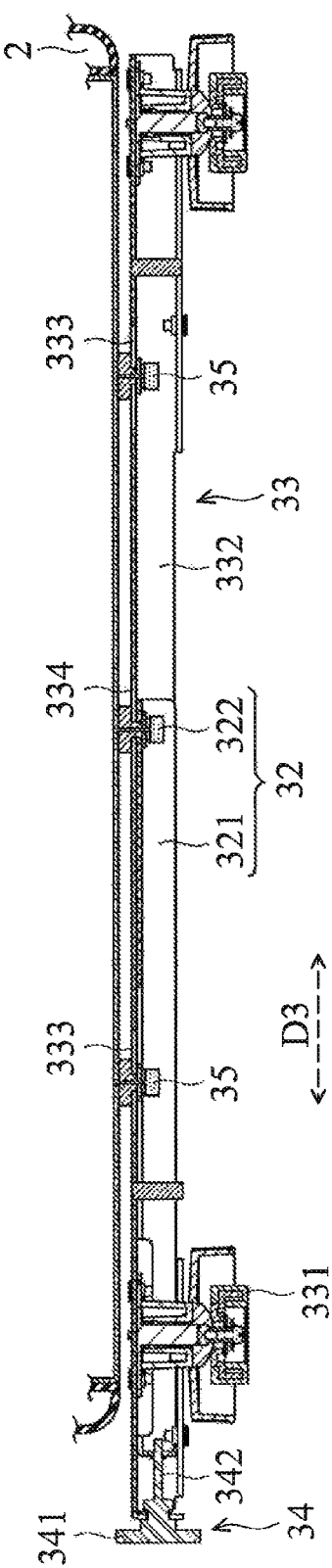
FIG. 5 is a cross-sectional schematic diagram of an adjusting device of the projector.
Figure 6:
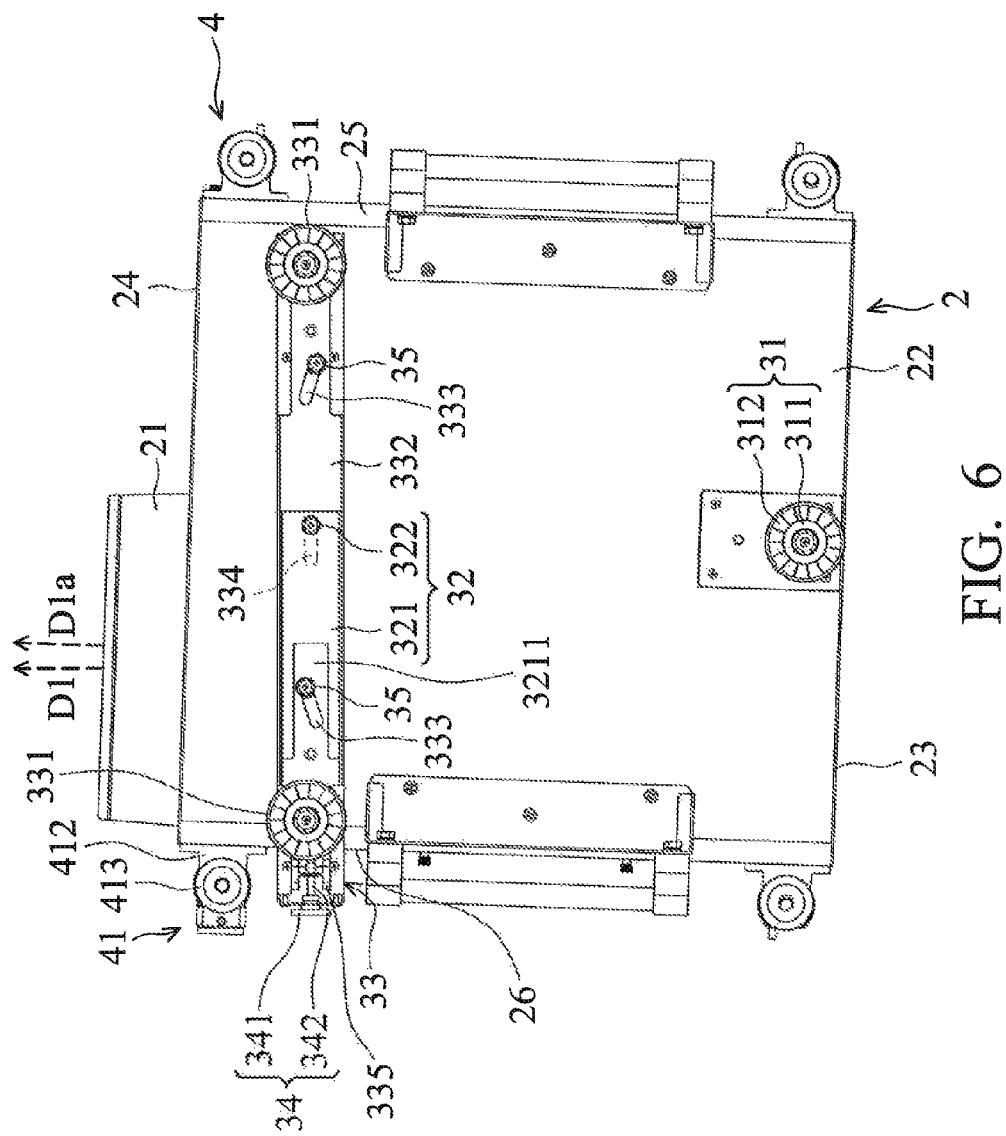
FIG. 6 is a bottom schematic diagram of a projecting apparatus of the invention.

Please refer to FIGS. 5 and 6. FIG. 5 is a cross-sectional schematic diagram the adjusting device 3 of the projector 2 and FIG. 6 is a bottom view of a projecting apparatus 1 of the invention. When the user rotates the rotation button 341, the adjusting rod 342 can be rotated. Moreover, because the adjusting rod 342 is fastened to the moving component 321, the adjusting rod 342 will drive the moving component 321 to move along the adjusting direction D3. At the same time, the fixed bases 331 of the fixed mechanism 33 and the rotatable base 31 will not be moved because of gravity force and the friction force between the projecting apparatus 1 and the ground. Namely, when the moving mechanism 32 is moved relative to the fixed component 332, a relative location of the fixed bases 331 and the rotatable base 31 is fixed. Therefore, the projector 2 can be pushed by the moving mechanism 32 to rotate horizontally about the axial center of the rotatable base 31. Then, the horizontal rotating angle of the projector 2 can be adjusted. Moreover, the projection direction D1 of the projecting lens 21 disposed at the front side 24 can be moved to the projection direction D1a.

Figure 7:
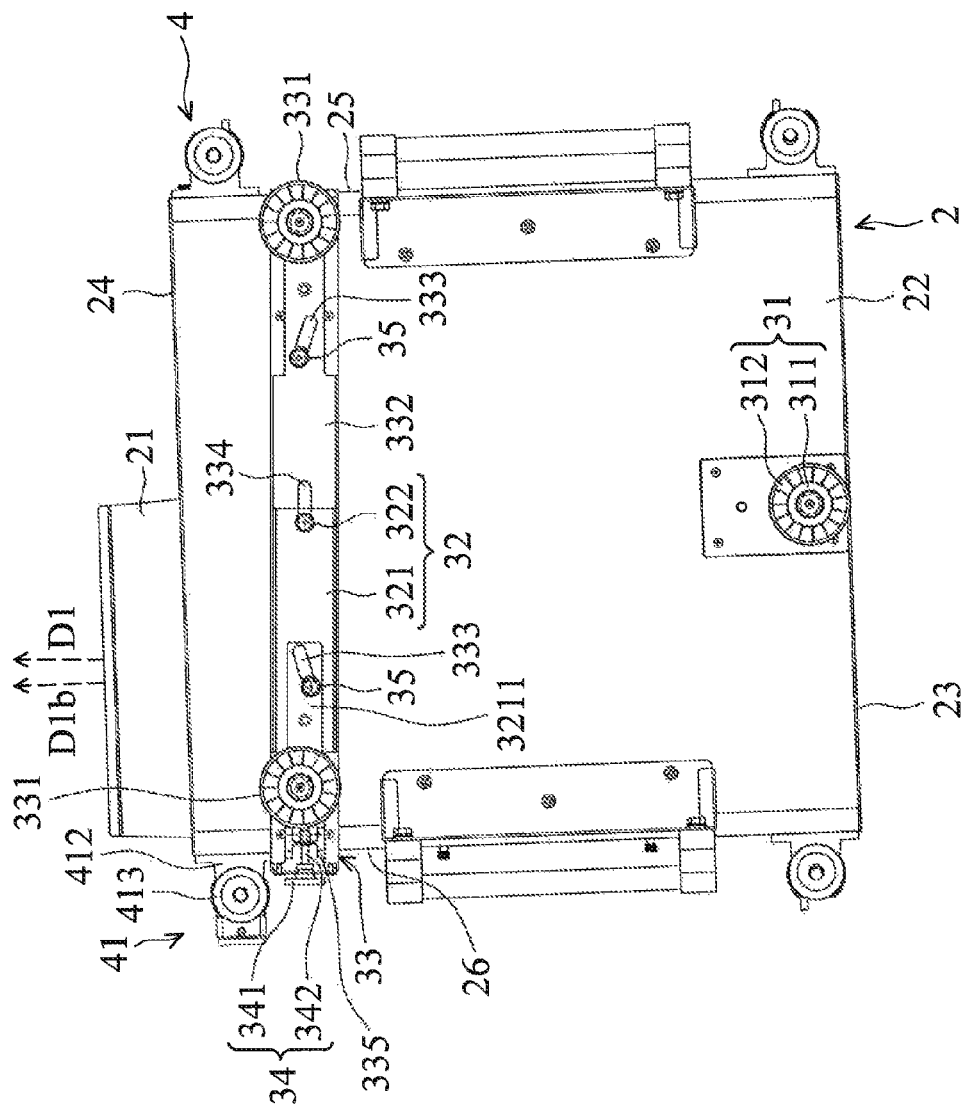
FIG. 7 is a schematic diagram illustrating a counter clockwise rotation of the projector of the invention.

In FIG. 6, when the projector 2 is rotated along a clockwise direction, the position component 322 is moved to an end of the position groove 334, and the retaining component 35 is moved to an end of the retaining groove 333. Therefore, the above structure can further assist and limit the projector 2 to horizontally rotate about the axial center of the rotatable base 31. FIG. 7 is a schematic diagram illustrating the rotation of the projector 2 along a counter clockwise direction. Here, the projector 2 is moved in a projection direction D1b.

In conclusion, the horizontal rotating angle and the projection direction of a projecting apparatus of this embodiment can be adjusted easily and accurately by adjusting the adjusting component.

Please refer to FIGS. 1 and 2. The rack device 4 includes a plurality of supporting racks 41, a first carrying seat 42, a second carrying seat 43 (please refer to FIG. 10), two third carrying seats 44, and an adjusting mechanism 45.

Figure 10:
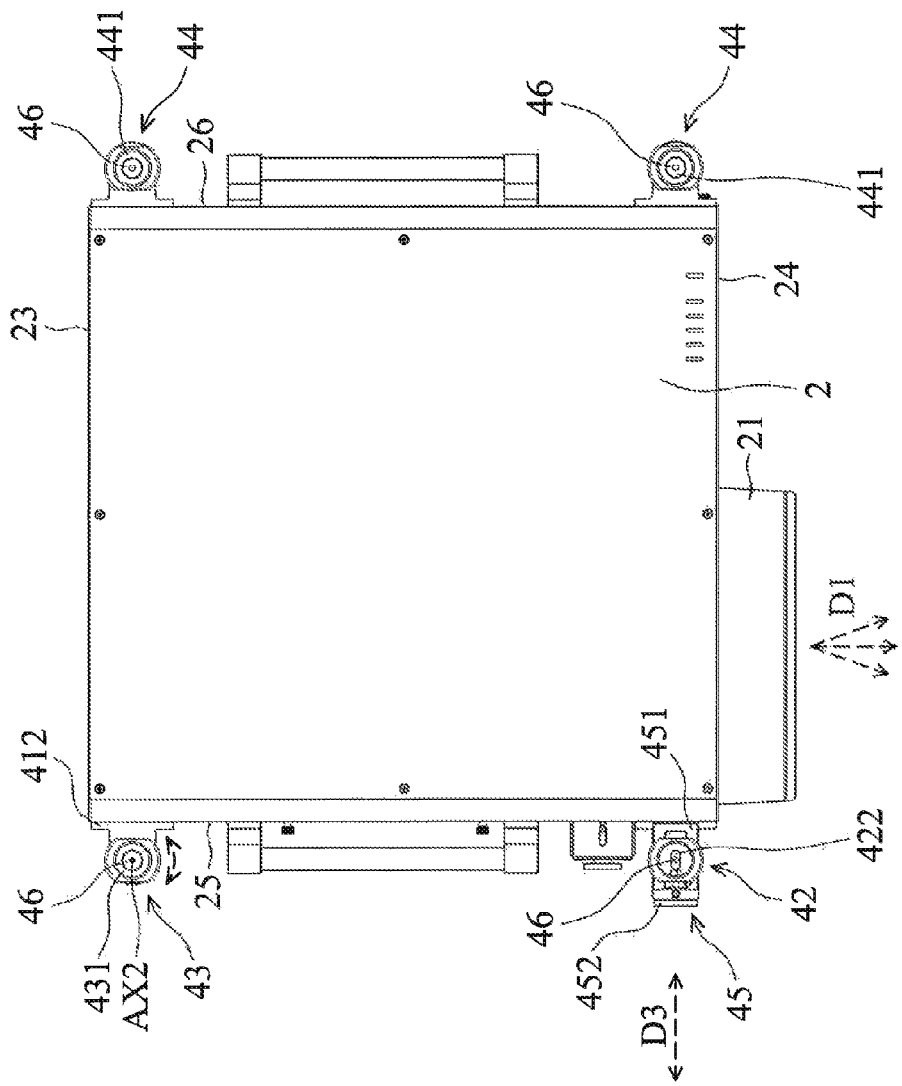
FIG. 10 is a top view of a projector of the invention.

The supporting racks 41 are extended along the extension direction D2. The first carrying seat 42, the second carrying seat 43 and the third carrying seats 44 are disposed at the top of the supporting racks 41, respectively. As depicted in FIGS. 1, 2 and 10, the first carrying seat 42, the second carrying seat 43 and the third carrying seats 44 are disposed on the longitudinal axes of the supporting racks 41, respectively. In the embodiment, the first carrying seat 42 is disposed at the lateral side 25 of the projector 2 close to the front side 24. The second carrying seat 43 is disposed at the lateral side 25 of the projector 2 close to the rear side 23. The third carrying seats 44 are disposed at the lateral side 26 of the projector 2 close to the front side 24 and the rear side 23, respectively. In other words, the supporting racks 41, the first carrying seat 42, the second carrying seat 43, and the third carrying seats 44 are located at the four corners of the lateral sides of the projector 2.

Figure 8:
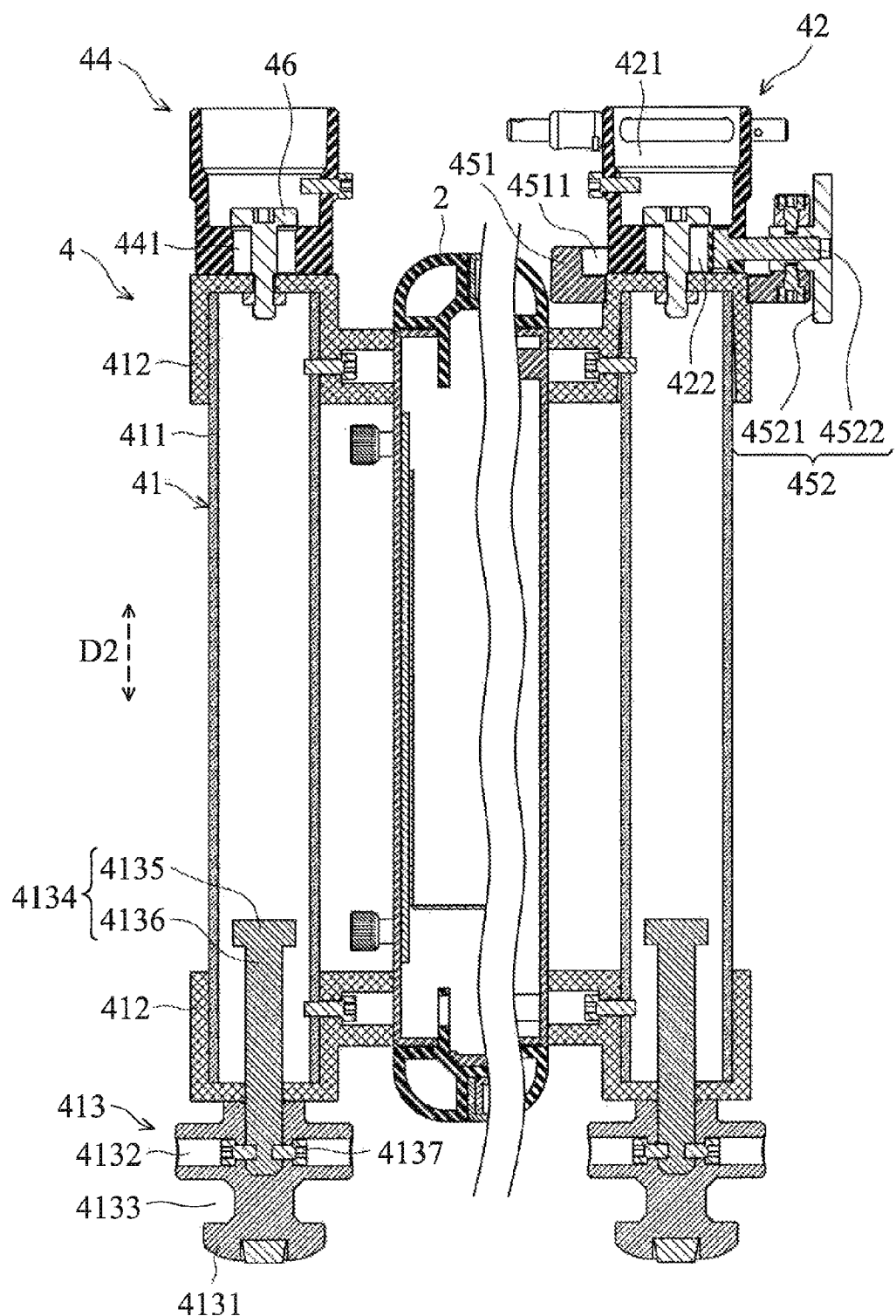
FIG. 8 is a cross-sectional schematic diagram of a rack device and a projector of the invention.

Please also refer to FIG. 8, which is a cross-sectional schematic diagram of a rack device 4 and the projector 2 of the invention. Each of the supporting racks 41 includes a supporting pole 411, two connecting components 412, and a pedestal 413. The supporting pole 411 is a hollow columella extended along the extension direction D2. The connecting components 412 are fixed at two ends of the supporting pole 411, respectively, and are connected to the supporting pole 411 and the side walls of the projector 2. Thus, the supporting racks 41 can be fixed to the projector 2.

The pedestal 413 includes a pedestal body 4131, an adjusting screw 4134, and a latching component 4137. The pedestal body 4131 has a locking hole 4132 and a latching groove 4133. The adjusting screw 4134 includes an adjusting nut 4135 and a screw body 4136. The adjusting nut 4135 and the screw body 4136 are formed as a single piece. The adjusting nut 4135 is movably disposed inside the supporting pole 411 and at an end of the screw body 4136. The screw body 4136 passes through and is fastened to the connecting component 412. In another embodiment, the screw body 4136 passes through and is fastened to an end of the supporting pole 411. The pedestal body 4131 is disposed at the other end of the screw body 4136. The latching component 4137 is fixed at the other end of the screw body 4136 via the locking hole 4132. Thus, the pedestal body 4131 is fixed at an end of the screw body 4136.

With the above structure, when a user rotates the pedestal body 4131, the adjusting nut 4135 of the adjusting screw 4134 will not detach from the inside of the supporting pole 411. A user can adjust the distance between the pedestal 413 and the supporting pole 411 by rotating the pedestal body 4131, and thus the inclination angle of the projector 2 can be adjusted.

Figure 9:
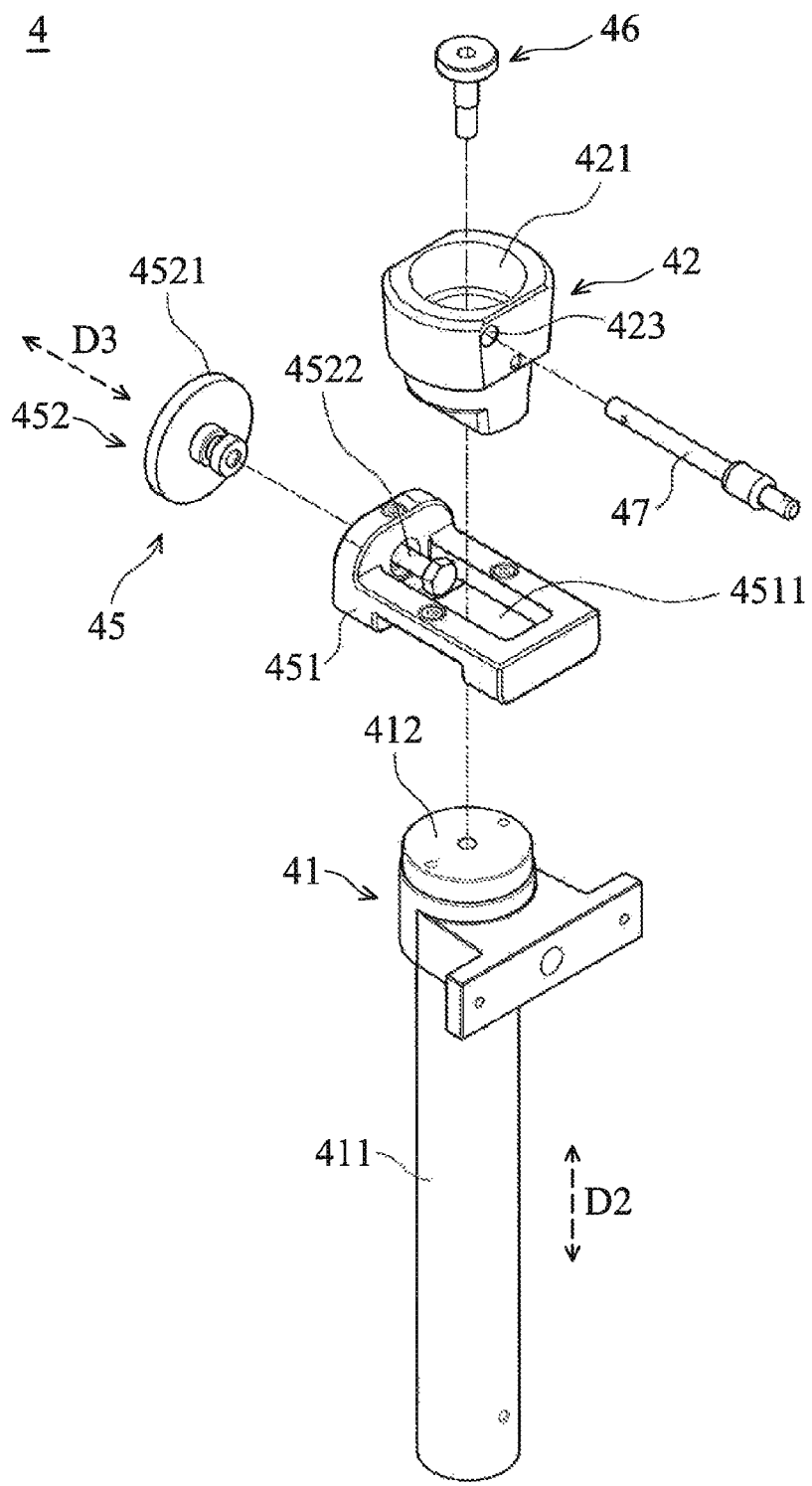
FIG. 9 is a partially exploded view of a rack device of the invention.

Please also refer to FIG. 9, which is a partial exploded view of a rack device 4 of the invention. The first carrying seat 42 and the adjusting mechanism 45 are disposed on the longitudinal axis of the first supporting rack 41, and the adjusting mechanism 45 is disposed between the first supporting rack 41 and the first carrying seat 42. The adjusting mechanism 45 includes an adjusting body 451 and an adjusting component 452. The adjusting body 451 is disposed on the connecting component 412. In another embodiment, the adjusting body 451 is disposed at an end of the supporting pole 411. The adjusting body 451 includes a containing hole 4511. The adjusting component 452 includes an adjusting button 4521 and an adjusting screw 4522. The adjusting button 4521 is disposed at an end of the adjusting screw 4522. The other end of the adjusting screw 4522 passes through the adjusting body 451 to extend into the containing hole 4511.

The first carrying seat 42 has a pedestal receiving groove 421, a first retaining hole 422, and a tenon hole 423 as shown in FIGS. 8 and 9. The pedestal receiving groove 421 communicates with the first retaining hole 422 and the tenon hole 423. The pedestal receiving groove 421 is formed at the top of the first carrying 42. The first retaining hole 422 is communicated to the pedestal receiving groove 421 and extened into the bottom of the first carrying seat 42. The first retaining hole 422 extends along the extension direction D1. Each of the supporting racks 41 includes a retaining pole 46. The retaining pole 46 passes through the first retaining hole 422 via the pedestal receiving groove 421 and is fixed on the connecting component 412. The area of the cross section of the retaining pole 46 is greater than the area of the first retaining hole 422. In another embodiment, the retaining pole 46 can be fixed at an end of the supporting pole 411.

The first carrying seat 42 is movably disposed on the adjusting body 451. The moving range of the first carrying seat 42 is limited by the first retaining hole 422 and the retaining pole 46. The bottom of the first carrying seat 42 is disposed in the containing hole 4511. The other end of the adjusting screw 4522 of the adjusting component 452 is connected to the side wall of the first carrying seat 42. With the above structure, a user can rotate and adjust the adjusting component 452, and the first carrying seat 42 can be horizontally moved along the adjusting direction D3 by the adjusting screw 4522. In another embodiment, the adjusting component 452 is a gear set driven by a motor (not shown in the figures), wherein the rotation of the motor can be controlled by a switch or a remote controller, and then the first carrying seat 42 can be moved by the adjusting component 452.

Please also refer to FIG. 10. The second retaining hole 431 of the second carrying seat 43 is in a circular shape. The area of the second retaining hole 431 corresponds to the side wall of the retaining pole 46. The second carrying seat 43 has a rotation axis AX2 at the axial center of the second retaining hole 431. The rotation axis AX2 is parallel to the extension direction D2. Thus, the second carrying seat 43 can be horizontally rotated with respect to the supporting rack 41. However, the second carrying seat 43 cannot be horizontally moved with respect to the supporting rack 41. The shape of the third retaining hole 441 of the third carrying seat 44 is a circular or an elliptic shape. The area of the third retaining hole 441 is greater than that of a cross section of the retaining pole 46. Therefore, the third carrying seat 44 can be horizontally moved and rotated with respect to the supporting rack 41. Moreover, in the embodiment, the structures of the second carrying seat 43 and the third carrying seat 44 can be the same as the first carrying seat 42.

Therefore, as shown in FIG. 1, when the projecting apparatus 1a is stacked on the projecting apparatus 1, the first carrying seat 42 can be moved along the adjusting direction D3 with respect to the first supporting rack 41 by adjusting the adjusting mechanism 45. Then, the projecting apparatus 1a is pushed by the first carrying seat 42 and rotated about the rotation axis AX2 of the second carrying seat 43. A user can change the projection direction D1 of the projecting apparatus 1a easily, conveniently and speedily.

Figure 11:
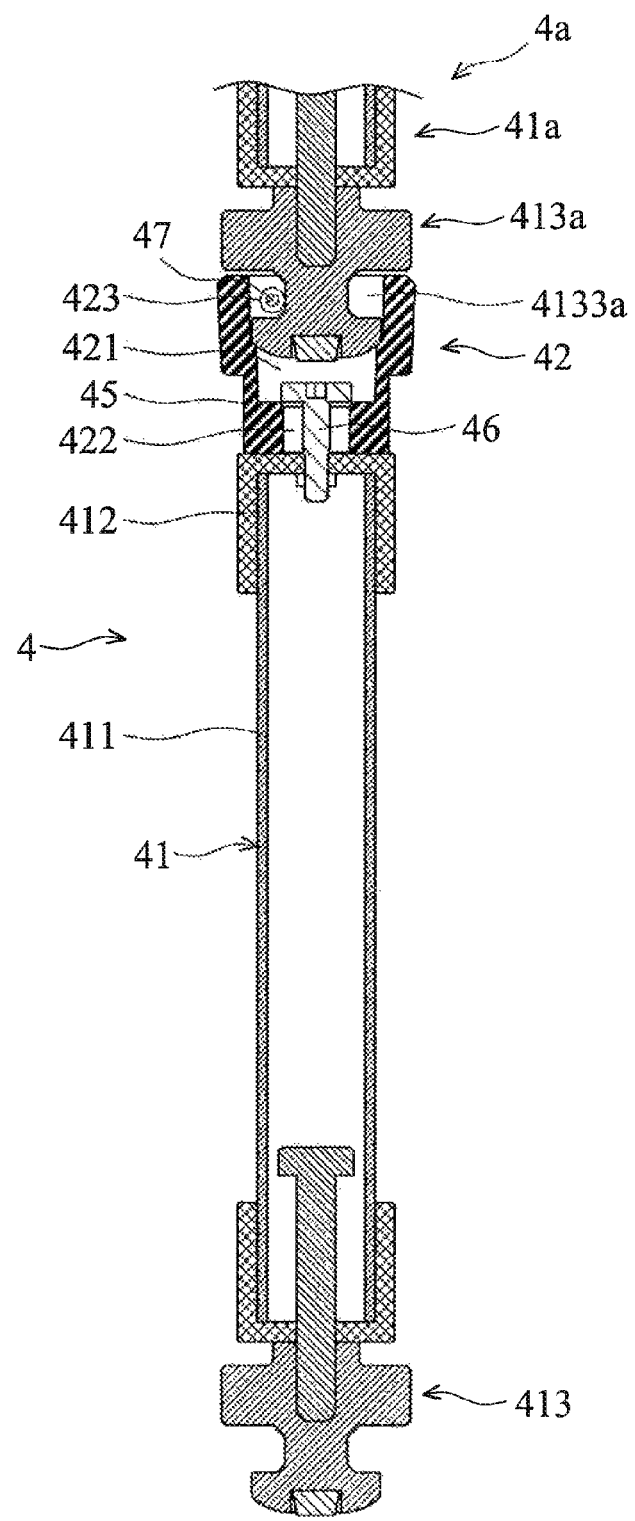
FIG. 11 is a cross-sectional schematic diagram of a rack device the invention.

Please also refer to FIG. 11. When another projecting apparatus 1a sub-projecting apparatus) as shown in FIG. 1 is disposed at the top of the projecting apparatus 1, a pedestal (sub-pedestal) 413a (the structure of the pedestal 413a is the same as that of the pedestal 413) of a supporting rack 41a (sub-supporting rack) of the projecting apparatus 1a is received in the pedestal receiving groove 421 of the carrying seat 42. The rack device 4 in this embodiment further includes a tenon 47. When the pedestal 413a of the projecting apparatus 1a is disposed in the pedestal receiving groove 421 of the first carrying seat 42, the tenon 47 is fixed to the latching groove 4133a of the pedestal 413a by passing the tenon 47 through the tenon hole 423. Therefore, a user can stack many projectors easily, and adjust the distance between the pedestal 413a and the supporting rack 41a by rotating the pedestal 413a to incline the projecting apparatus 1a.

For the same reason, the other pedestals 413a of the supporting rack 41a can be disposed on the other carrying seats of the rack device 4 according to FIGS. 1 and 11, the detailed description is omitted.

In conclusion, the projectors can be stacked together by the rack device in the projecting apparatus of the invention. The projection direction and the horizontal rotating angle of the projector can be adjusted by the supporting rack, the carrying seat, and the adjusting mechanism. The user can adjust the bottom projector first, and then sequentially adjust the projectors stacked on the bottom projector by adjusting the adjusting mechanism. Therefore, the images projected from the projectors can accurately overlap on the same screen easily, conveniently, and speedily.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projecting apparatus having an adjusting function to adjust a sub-projecting apparatus, comprising:
    a projector;
    a first supporting rack disposed on a side wall of the projector and having a first longitudinal axis;
    a first carrying seat disposed on the first longitudinal axis of the first supporting rack;
    an adjusting mechanism disposed on the first longitudinal axis of the first supporting rack and between the first supporting rack and the first carrying seat, wherein the adjusting mechanism comprises:
        an adjusting body with the first carrying seat disposed thereon; and
        an adjusting component connected to the adjusting body and the first carrying seat;
    a second supporting rack disposed on the side wall of the projector and having a second longitudinal axis; and
    a second carrying seat disposed on the second longitudinal axis of the second supporting rack and pivoting on the second supporting rack,
    wherein the sub-projecting apparatus is disposed on the first carrying seat and the second carrying seat, the adjusting mechanism is adjusted to move the first carrying seat relative to the first supporting rack along a horizontal direction perpendicular to the first longitudinal axis, and the first carrying seat drives the sub-projecting apparatus to rotate.

2. The projecting apparatus as claimed in claim 1, wherein the sub-projecting apparatus comprises a sub-pedestal, and the first carrying seat comprises a pedestal receiving groove to receive the sub-pedestal.

3. The projecting apparatus as claimed in claim 2, further comprising a tenon, wherein the first carrying seat comprises a tenon hole, the tenon hole and the pedestal receiving groove communicate with each other, and the sub-pedestal is fixed by the tenon passing through the tenon hole to the pedestal receiving groove.

4. The projecting apparatus as claimed in claim 2, wherein the first supporting rack comprises a retaining pole, and the first carrying seat further comprises a first retaining hole, and the first retaining hole is disposed on the pedestal receiving groove, the retaining pole passes through the first retaining hole, and an area of a cross section of the retaining pole is greater than an area of the first retaining hole.

5. The projecting apparatus as claimed in claim 1, further comprising:
- a third supporting rack disposed on a side wall of the projector; and
- a third carrying seat movably disposed on the third supporting rack,
- wherein the sub-projecting apparatus is disposed on the first carrying seat, the second carrying seat, and the third carrying seat.

6. The projecting apparatus as claimed in claim 1, wherein the adjusting component comprises an adjusting screw and an adjusting button, and the adjusting screw passes through the adjusting body, the adjusting button is disposed at an end of the adjusting screw, and the first carrying seat is disposed at another end of the adjusting screw.

7. The projecting apparatus as claimed in claim 1, wherein the first supporting rack comprises:
- a supporting pole;
- a connecting component connected to the supporting pole and the projector; and
- a pedestal disposed at an end of the supporting pole, wherein the first carrying seat is disposed at the other end of the supporting pole.

8. The projecting apparatus as claimed in claim 7, wherein the pedestal comprises:
- an adjusting screw fastened to the supporting pole;
- an adjusting nut movably disposed within the supporting pole and connected to an end of the adjusting screw; and
- a pedestal body connected to another end of the adjusting screw,
- wherein the pedestal body is rotated to adjust a distance between the pedestal body and the supporting pole.

9. The projecting apparatus as claimed in claim 8, wherein the pedestal body has a latching groove, and the pedestal further comprises a latching component received in the latching groove and connected to another end of the adjusting screw.

* * * * *